(12) United States Patent
Kobayashi et al.

(10) Patent No.: US 6,526,385 B1
(45) Date of Patent: Feb. 25, 2003

(54) SYSTEM FOR EMBEDDING ADDITIONAL INFORMATION IN AUDIO DATA

(75) Inventors: Seiji Kobayashi, Yokohama (JP); Dean D. Chen, Sunnyvale, CA (US); Yoshiaki Ohshima, Tokyo-To (JP); Shuichi Shimizu, Yokohama (JP); Norishige Morimoto, Tokyo-To (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,316

(22) Filed: Sep. 15, 1999

(30) Foreign Application Priority Data

Sep. 29, 1998 (JP) .......................................... 10-276230

(51) Int. Cl.[7] .............................................. G10L 21/04
(52) U.S. Cl. ...................... 704/504; 704/502; 704/503; 704/273; 704/200.1; 348/423.1; 348/484
(58) Field of Search ................................ 704/270–275, 704/200.1, 500–504; 713/176; 380/226; 705/57; 725/67, 68; 348/423.1, 484; 386/95, 111, 125

(56) References Cited

U.S. PATENT DOCUMENTS 5,949,885 A * 9/1999 Leighton ................... 283/113
6,122,392 A * 9/2000 Rhoads ....................... 382/110
6,282,299 B1 * 8/2001 Tewfik et al. .............. 382/100

FOREIGN PATENT DOCUMENTS

| EP | 0372601 A1 | 8/1989 | H04B/1/16 |
| EP | 0766468 A2 | 6/1996 | H04N/7/08 |
| EP | 0828372 A2 | 4/1997 | H04N/1/32 |
| JP | 9-191394 A | 7/1997 | |
| JP | 11272299 A | 10/1999 | G10L/9/14 |
| JP | 2000089796 | 3/2000 | G10L/19/00 |

OTHER PUBLICATIONS

Ye Wang ("A new watermarking method of digital audio content for copyright protection", ICSP'98, Signal Processing Proceedings, 1998, vol. 2, pp. 1420–1423, Oct., 1998).*

Lie et al, ("Robust and high-quality time domain audio watermarking subject to psychoacoustic masking", vol. 2, The 2001 IEEE International symposium on Circuits and Systems, May 2001, pp. 45–48).*

* cited by examiner

Primary Examiner—Vijay Chawan
(74) Attorney, Agent, or Firm—Louis Herzberg

(57) ABSTRACT

A method and a system is provided for embedding and detecting additional information, such as copyright information, in audio data, so that a modification in the sonic quality due to the embedding is imperceptible to human beings, and does not drastically deteriorate the sonic quality.

63 Claims, 9 Drawing Sheets

Additional information embedding

Additional information embedding

Additional information embedding process

Additional information detection process

Method for employing phase
to search for frame start point

Method for estimating time compression/expansion ratio
according to embedding signal whose phase is aligned Conventional information arrangement
Information arrangement for the present invention
Method for embedding multiple information
having different repetition cycles
Fig. 10
Invert sign signals for frames
Do not embed sign signals for frames
 -- Frame
 -- Sign signal
Method for employing delimiting frames for
the interpretation of bytes, words and messages
Fig. 11

(Embedding)
- Additional information bits : 1101101
- Additional information bits + additional bit ⇒ Expanded bits :
  11011010
- Repeat : 1101101011011010110101011011010
- Add delimiting bits 00100011 by employing an XOR operation and repetitively embedding the resultant bits every other set interval :
  11011010111100111011010111110011011010

(Detection)
- Detect bits :
  11010110110101111100111011010111110011011010
- Add the detected bits by employing an XOR operation, while shifting the sequence the message bit length :
  00011001000110010001100100011001000110010001100100011
- Define delimiter by bit matching with the delimiting bits 00100011
- Obtain bits in which an additional bit is not inserted :
  1101101

Method for estimating message
start point by adding specific bits

Fig. 12

(Embedding)
- Repeatedly add, to additional information bits, detected bits to which a bit is added
- Add delimiting bits by employing an XOR operation and repetitively embedding the resultant bits every other set interval (Detection)
- Calculate inner product to obtain correlation of repetition Obtained inner product    x x x x x x x x y y y y y y y ...

Shifted inner product            x x x x x x x x y y y ...

Delimiting bits         — — + — — — + + — — + — — — + + — — — ...

Collect inner products
- Obtain the location of delimiting bits for which the sum of the inner products is the maximum Method for estimating a message start point while
taking into account the detection reliability of frames

Fig. 13

Method for estimating the start points
of plural messages by adding specific bits

[Example for embedding 3 bits (8 states) using 5 bits]

Embedding a code word that
can be identified after a cyclic shift

SYSTEM FOR EMBEDDING ADDITIONAL INFORMATION IN AUDIO DATA

FIELD OF THE INVENTION

The present invention relates to a method and a system for embedding additional information, such as copyright information, in digital audio data, and for detecting the embedded information. In particular, the present invention pertains to a method and a system for precisely detecting additional information that has been embedded when the audio data in which the additional information has been embedded are so transformed that the sonic quality of the audio data is not drastically deteriorated.

BACKGROUND OF THE INVENTION

At present, digital music is provided not only on CDs but also across the Internet. Such digital audio data are so stable that regardless of how often the data are played, the sonic quality is not deteriorated. However, since large quantities of the data can be copied easily, techniques for preventing the illegal copying of data have become ever more important. To prevent such illegal copying, copyright information can be embedded in audio data to clearly evidence the existence of a copyright, or information concerning a distribution destination can be embedded so that the route along which an illegal copy travels can be traced. In order not to reduce the value of the audio components, changes in sonic quality due to the embedding of information must not be aurally perceivable by humans. Furthermore, since processing such as filtering, the compression/decompression performed with MPEG, AC3 or ATRAC, digital to analog and analog to digital conversions, trimming, and the changing of the replay speed may be performed using the digital components, the embedded information must survive even through the changing, the loss, the insertion or the re-sampling of data values that occurs in a range wherein the sonic quality of audio data is not drastically deteriorated.

The conventional detection method for embedding additional information in audio data is superior in the maintenance of secrecy. However, when additional information is embedded with less modification so that it is imperceptible to human beings, the embedded information could be lost during data processing activities, such as compression/decompression, filtering and digital to analog conversion, so that the conventional method has a problem as for robustness. The ordinary method used for embedding additional information in audio data is a spread spectrum method that uses PN (Pseudo-random Noise) modulation. According to this method, in the time domain, additional information is modulated using pseudo-random noise and the resultant information is embedded. As a result, in the frequency domain, the spectrum of a component that corresponds to the embedded information appears to spread. This method is disclosed in U.S. Pat. Nos. 4,979,210, 5,073,925 and 5,319,735.

According to the above methods, bit data Bm is modulated using pseudo-random numbers Rn consisting of +1 and 1 generated by a suitable encryption technique (e.g., DES), and the resultant bit information is embedded in audio samples An as follows.

$$A'_{Nm+n} = A_{Nm+n} + c B_m R_{Nm+n} \quad \text{Expression 1}$$

wherein Bm denotes +1 or 1 that represents one bit, n=0, 1, . . . , N=1, and c denotes the strength for embedding information. For the detection of the embedded information, bit information is detected by calculating $$B_m = \frac{1}{cN} \sum_{n=0}^{N-1} A'_{Nm+n} R_{Nm+n} \quad \text{Expression 2}$$

This is because it can be expected that if sequence Rn is random, the values $\Sigma A_{Nm+n} R_{Mn+n}$ will cancel each other out. To embed information at time domain, the perception frequency response of a human being can not be utilized and the deterioration of the sonic quality can not be prevented. Thus, if information is embedded with small modification level so that human beings can not aurally perceive the modification in the sonic quality due to the embedding, the embedded information will not survive the execution of some post-processes, such as compression/decompression.

On the other hand, according to the technique in U.S. Pat. No. 5,687,191, in the embedding information process, samples constituting time signals are divided by a polyphase filter to obtain frequency bands, and in each frequency band, information is modulated with pseudo-random noise and the information is embedded. The advantages conferred by this are that different embedding strengths can be employed for the individual frequency bands, and that the frequency property of a human being's aural perception can be utilized. Therefore, with this method, unlike with the other conventional methods, information can be embedded that can be robust and that does not deteriorate the sonic quality.

According to the methods disclosed in U.S. Pat. Nos. 5,613,004 and 5,687,236, as well as in the present invention, information is embedded in the frequency component that is transformed, and thereafter is detected. With these methods, in order to improve secrecy, the embedding and detection means in a frequency domain is proposed as a signal spreading means. However, in these USPs, the embedding and detection method that has a high sonic quality and is robust is not proposed. With these methods, uncompressed digital audio samples are divided into areas that do not overlap each other (called windows), and an FFT (Fast Fourier Transform) is applied for each of the individual windows. A primary mask and a convolutional mask are employed to determine whether a one bit signal should be embedded in a frequency component obtained by means of the FFT. The primary mask and the convolutional mask are pseudo-random bits, and the size of the primary mask corresponds to the value of the frequency. Each window corresponds to a specific position in the convolutional mask. Whether information is to be embedded in the frequency components of the windows is determined depending on whether the result of the logical calculation of the bit value of the primary mask, at the position corresponding to the frequency, and the bit value of the convolutional mask, at the position corresponding to the window, is true or false.

According to the embedding method disclosed in U.S. Pat. No. 5,613,004, map information bits (redundant bits produced from additional information) are embedded in specific bit positions of the embedding frequency component. In U.S. Pat. No. 5,687,236, bits are embedded by modifying them so that they fall in levels that are determined in advance relative to the original value. In either case, one bit is embedded in one frequency component, and the secrecy of the embedded information can be maintained by using the primary mask and the convolution mask. However, the embedded information can not survive the performance of data processing, such as compression/decompression and the addition of random noise to each frequency component.

The delimiter of the message start is a sign consisting of relatively many bits, and is used to detect the delimiting of windows in detected bits and a message start point. According to the specifications for these patents, 64 bits are embedded in one window of 128 samples, and a 1024 bit sign is obtained for 16 windows. Since it is highly improbable these signs will be identical, a specific 1024 bit sign can be employed as the delimiter of the message start. To search for the delimiter of the windows and the message start point, the window start point is shifted one sample at a time until the delimiter of the message start is detected. With this method, if the embedded information is long, the load imposed by the search for the message start point will be increased, and this method can not cope with a request for re-synchronization due to the loss or the insertion of data that frequently occurs during a digital to analog conversion.

It is, therefore, one object of the present invention to provide a method and a system for embedding additional information, such as copyright information, in audio data, so that a modification in the sonic quality due to the embedding is imperceptible to human beings, and for maintaining the embedded information and precisely detecting it after audio data processing has been performed at a level whereat the sonic quality was not drastically deteriorated.

It is one more object of the present invention to provide a method and a system whereby additional information can be embedded in audio data and can be detected, while a high sonic quality and high robustness are maintained.

It is another object of the present invention to provide a method and a system for transforming samples of audio data into frequency components, and for manipulating the obtained data in the frequency domain to embed additional information.

It is an additional object of the present invention to provide a method and a system, for embedding additional information in audio data, that is robust against destruction during the data processing, such as the compression/decompression of data and the addition of random noise to individual frequency components.

It is a further object of the present invention to provide a method and a system for embedding additional information in audio data and detecting the embedded information, and for reducing the load imposed by the search for the embedded additional information.

It is one further object of the present invention to provide a method and a system for embedding additional information in audio data and for detecting the embedded information, and for coping with a request for re-synchronization due to the loss or the insertion of data that occurs frequently in digital to analog conversion.

SUMMARY OF THE INVENTION

To achieve the above objects, according to one aspect of the present invention, provided are an "embedding system," for embedding additional information, such as copyright information, in uncompressed digital audio data, so that a change in sonic quality is imperceptible to human beings; and a "detection system," for, even when data compression/decompression or a trimming procedure has been performed for the audio data, determining whether additional information has been embedded and detecting embedded information.

Uncompressed digital audio data for each channel is constituted by a sequence of integers, called a sample. For the audio data provided by CDs, each channel is constituted by 44,100 16-bit samples per second. According to this invention, information is embedded and is detected at the frequency domain, so that a psychoacoustic model can be employed. Therefore, in the embedding system and the detection system of the present invention, the audio samples are divided into pieces having a constant length, and individual delimited samples pieces are transformed in the frequency domain. Each interval of the pieces of samples to be transformed is called a frame.

The additional information embedding processing according to the present invention is shown in FIG. 4. At step 410 a mask that defines for each frequency the phase of an embedding signal is employed to embed bit information corresponding to the additional information and a synchronization signal in the frequency component obtained from the individual frames of transformed audio data in a frequency domain, and the audio data in the frequency domain is invertedly transformed into the audio samples in time domain. In the embedding process, the frames do not overlap each other, and successive frames may not be adjacent. When the trimming robustness is required, additional information is repetitively embedded.

The additional information detection processing is shown in FIG. 5. At step 510 the searching of audio data samples is performed to find a start point of a frame. At step 520, when it is determined that additional information has been embedded, a detection mask is employed to detect a bit embedded in a frequency component. At step 530 a point whereat the cycle of additional information repetitively embedded has been started is searched for, and the embedded additional information is reproduced.

According to the present invention, provided are a method and a system for embedding, in each frame, information that is aurally imperceptible to human beings but is robust, and for detecting the embedded information; a frame synchronization method and system for searching for the correct frame start and end point before embedded information is detected; and a message synchronization method and system for searching for the bit cycle start and end points in order to reproduce bits (message) by using the bit information detected in each frame.

Specifically, to embed additional information in audio data, first the audio data are transformed into frequency components. Based on the audio data, the level of modification for each frequency component is determined to be one in which additional information can be embedded in the audio data, and a mask used for embedding additional information is generated. Then, the additional information is embedded, using that mask, within the modification level of the frequency component obtained from the transformed audio data. Finally, the transformed audio data in which the additional information is embedded are invertedly transformed into audio data in time domain. To detect additional information embedded in audio data, synchronization detection means is provided for transforming the audio data into frequency components, for producing a mask used for the detection of additional information and for obtaining synchronization for the detection of additional information. Then, using this mask the additional information in the transformed audio data is synchronously detected from the transformed audio data.

BRIEF DESCRIPTION OF THE DRAWINGS

FIG. 10 is a diagram showing the difference between the conventional method and the method of the present invention that is employed to embed sets of information for which different intervals are established.

FIG. 11 is a conceptual diagram of the procedure employed when frames where the message embedding cycle starts are used for the interpretation of bytes, words and messages.

FIG. 12 is a diagram for explaining the method used to estimate the start point of a message by adding specific bits.

FIG. 13 is a diagram for explaining the method used to estimate the start point of a message while taking into account the detection reliability of a frame.

DETAILED DESCRIPTION

A more detailed explanation will be given for the methods and the systems for embedding additional information in audio data and for detecting the embedded information.

[Embedding/detection Methods and Systems for Each Frame]

A frame serves as a unit of samples for a transformation in a frequency domain. The method and the system used for the embedding and the detecting of information for individual frames will now be described. In order to effectively employ a psychoacoustic model, the number of samples of a frame that is considered reasonable is greater than 128, as is described in U.S. Pat. Nos. 5,613,004 and 5,687,236, and actually ranges from about 512 to 2048.

In the following explanation, an n-th sample in an m-th frame of uncompressed audio data is denoted as Am(n), and a component of frequency k obtained by transforming the m-th frame into frequency components is denoted as Fm(k). When there is no interval between the successive frames and when the number of samples in a frame is N, the following relationship is established.

$$A_m(n) = A_{Nm+n} \qquad \text{Expression 3}$$

Since the original sample is a real number, even though the individual frequency components are complex numbers that each consist of a real part and an imaginary part, Fm(k) and Fm(N−k)=Fm(−k) are complex conjugates. In other words, the number of independent frequencies is half the number of samples in a frame, i.e., N/2. The complex number is regarded as a two-dimensional vector, and formally the inner product is defined by using the following expression.

$$\alpha \cdot \beta = \alpha_x \beta_x + \alpha_y \beta_y \qquad \text{Expression 4}$$

This expression is employed in the following description. Subscripted x and y denote a real part and an imaginary part. At this time, according to the definition, $$\alpha \cdot \alpha = |\alpha|^2.$$

Assume that the embedding system and the detection system employ in common a set of complex numbers Mp(k) that are pseudo-random numbers relative to each frequency k, and are hereinafter called masks. However, since the embedding mask is a real number in the time domain, Mp(k) and Mp(−k) are complex conjugates. In addition, when Mp(k) consists only of complex numbers having an absolute value of 1, it is assumed that its phase is pseudo-random oriented. If Mp(k) is a pure imaginary number, it is pseudo-random along the imaginary axis. That is, in accordance with the purpose, assume that an adequate limitation is provided for the available range represented by Mp(k).

[Signal Embedding in a Frame]

Figure 6:
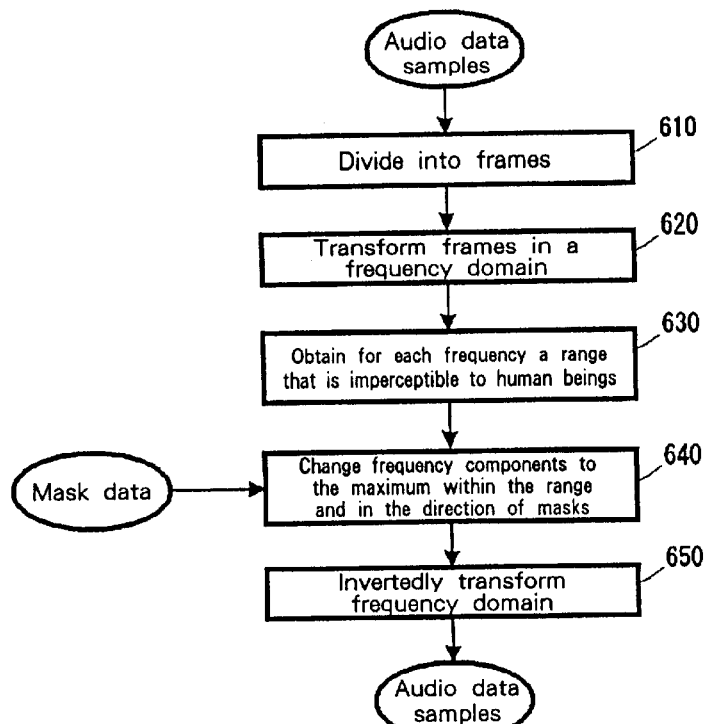
FIG. 6 is a flowchart showing the processing performed to embed a signal in a frame.

The processing according to the present invention for embedding a signal in a frame is shown in FIG. 6. At step 610 audio samples are divided into frames. At step 620 the individual frames are transformed into frequency components. At step 630 the obtained frequency components are employed to calculate a psychoacoustic model, and a modification level change that is imperceptible to human beings is obtained for each frequency. At step 640, the values of the frequency components are modified as much as possible at the obtained modification level in the directions of the masks acquired by pseudo-random numbers, and bit information, sign information and a synchronization signal are embedded. If the robustness of embedding information is more important than is the sonic quality, the inner products of the frequency components and the individual masks are calculated. When an inner product is smaller than a threshold value required for the robustness, the modification amount in the frequency component is extended until it equals the threshold value, even when the manipulation amount to frequency component exceeds the maximum modification level of the psychoacoustic model. If the sonic quality is more important and the inner product is greater than the threshold value, the modification amount is reduced until it equals the threshold value. When the frequency components have been changed, at step 650 the obtained frequency components are invertedly transformed for retrieve the audio samples from the frequency domain to the time domain. When the frequency component Fm(k) obtained by the transformation of each frame is changed as follows:

$$F'_m(k) = F_m(k) + h_m(k) \qquad \text{Expression 5}$$

the bit information and the synchronization signal can be embedded. Since the frequency component is a complex number, a modification level hm(k) is also a complex number. The psychoacoustic model, such as an acoustic masking model, is calculated for the frequency distribution Fm, and the frequency level for the modification level hm(k) imperceptible to human beings is obtained for each frequency k. The imperceptible level generally has a two complicated dimensional shape. Therefore, even when the statement that the modification hm(k) is the maximum modification that is imperceptible to human beings, the absolute value |hm(k)| is not always the maximum value and is generally located at the border of the modification levels. The acoustic masking model is used to simulate on a computer a condition wherein the level of modification for each frequency, which is imperceptible to human beings, is changed in accordance with the spectral distribution of frequencies, for example, the condition where, when a large volume of pure noise is present, the modification of the preceding and the succeeding frequencies can not be perceived by human beings.

The embedding of frequency components in the directions of the masks means that the frequency components are so changed that the inner product as represented by $$X_p(m) = \sum_k C(F'_m, k)(M_p(k) \cdot F'_m(k)) \quad \text{Expression 6}$$

has the desired signs or values. In this case, C(Fm,k) represents the positive normalized constant that depends on the frequency distribution Fm and the frequency k, and is used to improve the reliability of a statistical estimate. When the masks are substantially orthogonal, the change in the frequency component due to the embedding is defined by $$h_m(k) = a(k) \sum_p b_p M_p(k) \quad \text{Expression 7}$$

In this expression, the real constant bp may be determined to be proportional to a desired sign or value for the inner product Xp(m) obtained with each mask; and positive constant a(k) may be adjusted so that it is located at the border of the modification levels that are imperceptible. Since normalized constant C(F'm,k) depends on the embedding results, the processes required to obtain the positive constant a(k) are successively performed.

The embedding of a bit value is performed for each frame. Therefore, if a modification level value differs between adjacent frames for the reason, for example, that the bit values to be embedded differ, a large discontinuity occurs at delimiters $A'_m(N-1)$ and $A'_{m+1}(0)$ of the frames, and listeners may regard the generated sounds as noise. Therefore, to prevent the deterioration of the sonic quality, the methods used for changing the frequency components and the shapes of masks are limited so that the modification amount is the same at both ends of all the frames. For example, the modification values and masks for the frequency components are limited to purely imaginary numbers. To limit the modification to the purely imaginary numbers is the same as embedding a signal for a sine wave in each frame in the time domain. As another example, the modifications to the frequency components and the masks are limited to real numbers, and a pair of even-numbered frequencies, {2k, 2k'}, and a pair of odd-numbered frequencies, {2k+1, 2k'+1}, are prepared. In order to cancel each other out at both ends of a frame, the values of the masks and the modification values of the paired frequencies have opposite signs, even though the numerals are the same, as in the following expressions.

$$M_p(2k)+M_p(2k')=0 \text{ and } h_m(2k)+h_m(2k')=0 \quad \text{Expression 8}$$

$$M_p(2k+1)+M_p(2k'+1)=0 \text{ and } h_m(2k+1)+h_m(2k'+1)=0 \quad \text{Expression 9}$$

To limit a modification amount to a real number is the same as embedding a signal for a cosine wave in each frame in the time domain.

In addition, since orthogonal masks are selected, even when information is sequentially embedded in accordance with different masks, the information embedded in one mask can be prevented from destroying that embedded in another, and the occurrence of a detection error whereof the information embedded in one mask is not detected due to the embedding of information in another mask does not take place. As a result, before audio data are uploaded to the server, copyright information of the data is embedded, and after a consumer downloads the audio data across the Internet, trace information such as a user ID is embedded to prevent the server and user from interfering with each other. For example, frequency k at which the mask value Mp(k) is not zero is set in a limited domain, and another mask is so set that a domain that differs from the above is not zero. Then, the orthogonal masks can be maintained without depending on the normalized constant C(Fm,k). At this time, the frequency area in which the masks are not zero is not set to a single frequency interval, but to a plurality of intervals so that the area covers a large number of frequencies, in order that the sonic quality and the robustness can be improved. According to the MPEG compression process, different parameters (scale factors) are employed for individual frequency bands (scale factor bands) for data compression, so that a parameter for controlling a gain is defined for each frequency band. If the frequency band is simply divided and a single interval is allocated for each mask, the robustness of the mask differs greatly in accordance with the data components. Therefore, the frequency band is divided to provide a width that is smaller than a sub-band that is the unit of compression processing, the frequency bands are so collected that the information embedding frequency bands are not concentrated in the low tone range or in the high tone range, and the masks orthogonal to each other are synthesized.

As is described above, according to the present invention, the embedding method for each frame, unlike the conventional method, is characterized in that:

Instead of embedding one bit in one frequency component, to embed information the frequency components in a large area are changed in the directions of the masks.

Instead of determining in advance a modification amount for each frequency, the frequency distribution obtained by frequency transformation is employed to determine, for each frequency, the maximum modification level that is imperceptible to human beings. Then based on the determined level, the modification amount for each frequency component is defined.

A limitation is imposed on the modification amounts of masks and the frequency component, so that the modification amount at both ends of each frame in the time domain is nearly zero.

A frequency band is divided into smaller bands and a plurality of these bands are collected so as to prevent frequency biasing, orthogonal masks are prepared, and multiplex information embedding is enabled whereby information is not destroyed by other information.

[Detection of Signal for a Frame]

Figure 7:
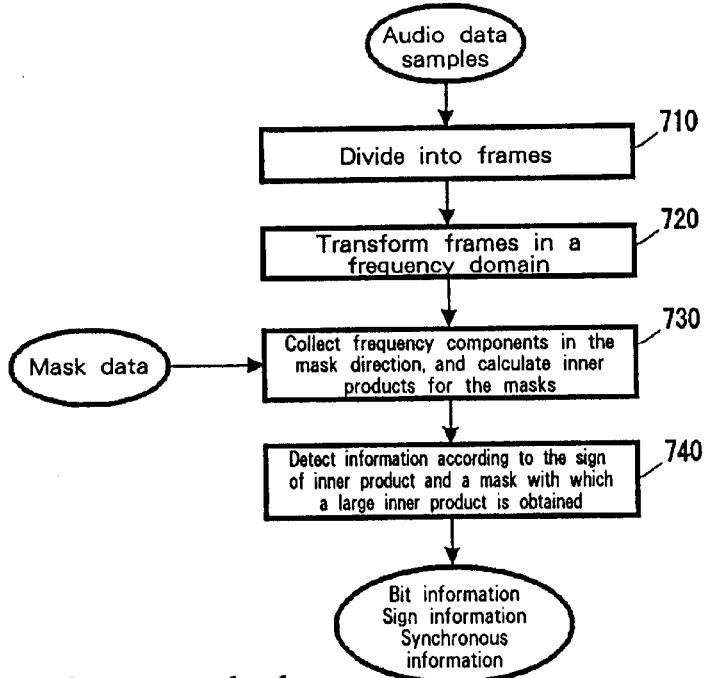
FIG. 7 is a flowchart showing the processing performed to detect a signal embedded in a frame.

The signal detection processing for a frame according to the present invention is shown in FIG. 7. At step 710 audio samples are divided into a plurality of frames. At step 720 the frames are transformed into frequency components. At step 730 the inner products of the frequency components and the detection mask are calculated. In order to improve the reliability of the detection of embedded information, as needed, the inner product for one frame is added to another frame in which the same information is embedded by multiplying it using an appropriate sign. That is, if the information was embedded with the same sign, it is added with the same sign, and if the information was embedded with the opposite sign, it is added with the inverted sign. Finally, at step 740 the bit information is detected in accordance with the sign of the inner product, or the mask with which the largest inner product was obtained. For each frame, the inner product of the frequency component Fm(k) and the mask Mp(k) is calculated using the following expression.

$$X_p(m) = \sum_k C(F_m, k)(M_p(k) \cdot F_m(k)) \qquad \text{Expression 10}$$

Here, the normalized constant C(Fm,k) defines a positive number that is introduced to improve the reliability of the statistical estimate and that depends on the frequency distribution and the frequency. Generally, the frequency spectrum |Fm(k)| is not uniformly distributed, and the amplitude tends to be shortened from that for a low frequency component to that for a high frequency component. A sound generator, or data components such as the melody of the music, cause the spectral distribution frequency to fluctuate greatly. To improve the reliability of the statistical estimate, the square of the statistical average <Xp(m)>, when the frequency component is modified to the maximum level that is imperceptible to a human being, is greater than the statistical average square <Xp(m)$^2$> obtained when no information is embedded. Since $$\langle X_p(m) \rangle = \sum_k C(F_m, k) a(k) |M_p(k)|^2 \qquad \text{Expression 11}$$

$$\langle (X_p(m))^2 \rangle = \sum_k (C(F_m, k))^2 (M_p(k) \cdot F_m(k))^2 \qquad \text{Expression 12}$$

are established, the normalized constant with which the reliability of the statistical estimate is improved is obtained by $$C(F_m, k) = \frac{ca(k)|M_p(k)|^2}{\langle (M_p(k) \cdot F_m(k))^2 \rangle} \qquad \text{Expression 13}$$

At this time, the following expression is established.

$$\frac{\langle X_p(m) \rangle^2}{\langle (X_p(m))^2 \rangle} \leq \sum_k \frac{(a(k))^2 |M_p(k)|^4}{\langle (M_p(k) \cdot F_m(k))^2 \rangle} \qquad \text{Expression 14}$$

wherein c defines an arbitrary constant, and a(k) is a maximum modification level that is imperceptible to human beings.

The denominator <(Mp(k)·Fm(k))$^2$> of the normalized constant varies, depending on the statistical average as being a primary set. When a model is employed wherein the frame start point fluctuates, $$\langle (M_p(k) \cdot F_m(k))^2 \rangle = \frac{1}{2} |M_p(k)|^2 |F_m(k)|^2 \qquad \text{Expression 15}$$

can be used to obtain an approximate value, and $$C(F_m, k) = a(k)/|F_m(k)|^2 \qquad \text{Expression 16}$$

is acquired. However, since the denominator should not be zero, when |Fm(k)| is smaller than a(k), it is replaced by it, or it is assumed that the following expression is established.

$$C(F_m, k) = a(k)/\{|F_m(k)|^2 + a(k)^2\} \qquad \text{Expression 17}$$

The upper limit that is set due to the modification or the replacement of the expression is an adequate approximate limit, when it is taken account that, after information has been embedded, compression/decompression causes a random modification such that human beings can not perceive a frequency change. When a simple auditory model wherein a(k) is proportional to |Fm(k)| is further employed, $$C(F_m, k) = 1/|F_m(k)| \qquad \text{Expression 18}$$

is established, and when |Fm(k)| is smaller than the threshold value, it is replaced by it. To examine the reliability of the obtained inner product, first, $$S_p(m) = \sum_k C(F_m, k)^2 (M_p(k) \cdot F_m(k))^2 \qquad \text{Expression 19}$$

is calculated, and it is assumed that $$x_p(m) = X_p(m)/S_p(m)^{1/2} \qquad \text{Expression 20}$$

follows the normalization distribution, so that a false positive error can be calculated.

Even when all the samples Am(n) are changed to −Am(n) at the same time, the sonic quality of the audio data is unchanged. This data processing is called the inversion of the polarity.

When apparatuses are connected together to exchange data, the inversion of the polarity occurs in accordance with the apparatus combination. Therefore, if a bit is defined simply in accordance with the inner product Xp(m) or the sign of Xp(m), the audio data is easily deteriorated by the inversion of the polarity. The two following methods can be employed as countermeasures:

a method for preparing a sign mask and a bit mask, and for retrieving a bit value by using the sign of the result obtained by multiplying the inner product of the bit mask by the inner product of the sign mask; and a method for preparing a mask for bit value 0 and a mask for bit value 1, and for retrieving a bit value in accordance with the mask with which the larger inner product is obtained.

The second method can be regarded as a modification of the first method.

According to the second method, two masks M0(k) and M1(k) are employed to embed one-bit information. The inner products $X_0(m)$ and $X_1(m)$ are obtained, and the following is established.

If $|X_0(m)| > |X_1(m)|$, bit 0.

If $|X_0(m)| < |X_1(m)|$, bit 1. $\qquad$ Expression 21

Specifically, $M_0(k)$ represents the mask for bit 0, and $M_1(k)$ represents the mask for bit 1. However, this method can be regarded as one of the methods for employing the sign mask Ms(k) and the bit mask Mb(k). That is, when $$M_s(k) = M_0(k) + M_1(k)$$

$$M_b(k) = M_1(k) - M_0(k) \qquad \text{Expression 22}$$

is established, $$X_s(m) = X_0(k) + X_1(k)$$

$$X_b(m) = X_1(k) - X_0(k) \qquad \text{Expression 23}$$

is also established for the corresponding sign inner product Xs(m) and bit inner product Xb(m). Thus, $$X_s(m)X_b(m)=(X_1(m)-X_0(m))(X_0(m)+X_1(m)) \quad \text{Expression 24}$$

is obtained. As is apparent from this expression, it can be assumed that if Xs(m) is positive, bit 0 is defined with Xb(m) being negative and bit 1 is defined with Xb(m) being positive, and that if Xs(m) is negative, bit 1 is defined with Xb(m) being negative, and bit 0 is defined with Xb(m) being positive.

A sign mask is a mask, such as the mask Ms(k), that employs the sign of the inner product for that mask to change the interpretation of the inner product for another bit mask. In order to detect the inversion of the polarity and to interpret the bit correctly, a single sign mask is sufficient for one embedding process. The sign of the inner product for the sign mask must be employed to change the interpretation of the signs of the inner products of other bit masks. In addition, since generally the polarity does not fluctuate within a short interval, to improve the robustness, a signal for the sign mask is embedded with small modification, and a signal for the bit mask is embedded with large modification. The signal for the sign mask is accumulated for each frame to improve the robustness. Assuming that the signal for the sign mask is always embedded in the same direction, the inner product and the distribution of the signals are obtained by the following expression and the sum of continuous frames m.

$$X_s = \sum_m X_s(m) \quad \text{Expression 25}$$

$$S_s = \sum_m S_s(m)$$

Since the audio data to be detected may fluctuate in the time domain or as a result of the inversion of the polarity, a large number should not be defined as the frame sum. The sign mask may be employed in common with the frame synchronization mask, or in accordance with a determination as for whether a frame is marked or unmarked. The determination whether a frame is marked or unmarked is performed by If $X_s^2/S_s > t^2$, a frame is marked.

If $X_s^2/S_s \leq t^2$, a frame is unmarked. Expression 26 wherein t is a threshold value for the determination. A corresponding false positive error is calculated while $$x_s = X_s/S_s^{1/2} \quad \text{Expression 27}$$

follows the normalization distribution. As is described above, the sign mask is more effective.

As is described above, according to the present invention the detection method for the frames differs from the prior art and is characterized in that instead of merely calculating for the simple inner products of frequency components and masks consisting of pseudo-random numbers, that inner products are multiplied by the normalized constants, which are determined from the frequency distribution and which depend on the frequencies, to obtain the final inner product;

instead of defining a bit value simply in accordance with the sign of the inner product, the sign of the inner product of a sign mask is employed to change the interpretation of a bit value of another mask;

for all the frames, the sign mask is embedded in the same direction, or alternately, with opposite signs, so that the collection of information spans the frames and the reliability of the detection can be improved; and the inner products accumulated for the sign mask are employed to determine whether a frame is marked or unmarked.

[Frame Synchronization Method and System]

For the process for detecting a signal for each frame, it is assumed that the audio samples are correctly divided into frames when information is embedded. After information has been embedded the audio data may be expanded or compressed in the time domain, or may be trimmed. Therefore, at the beginning of the detection process and when the determination that embedded information is present is less reliable, the time compression/expansion ratio for the audio data must be estimated, and when information is embedded the frame start point must be searched for.

[Method for Searching for Frame Start Point Using Phase]

Figure 8:
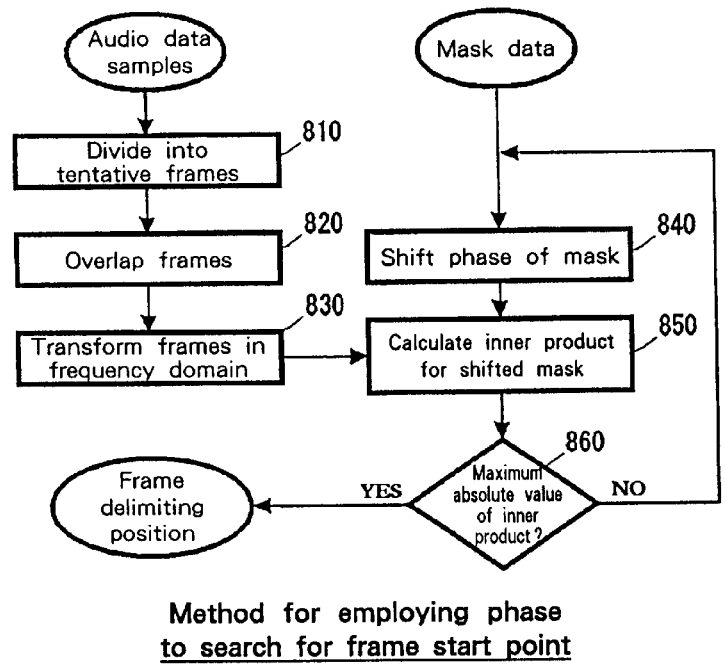
FIG. 8 is a flowchart showing the processing performed to search for a frame start point using the phase.

If for each frame a signal is embedded with a sufficiently large modification, the start point for the audio sample is shifted in order to detect one temporary frame from the samples. This frame is transformed into a frequency component, and the location at which the greatest sum for the absolute values of the inner products is obtained for the individual masks is presumed to be the frame start point in the embedding process. If the signal is embedded with small modification in order to prevent the deterioration of the sonic quality due to the embedding of information, it is assumed that, in the embedding system, the same intervals are set for the frames that are continuously arranged, so that in the detection system, the shifting of the same start point can be employed for a plurality of different frames. Thus, instead of determining the start point using a single frame, a start point at which an adequate value can be provided for a plurality of frames at the same time is searched for by shifting one sample at a time, so that when information is embedded the frame start point can be precisely detected. However, in either case, while shifting the position one audio sample at a time an FFT is performed for the individual frames at a tentative start point, so that too much calculation time is required to search for a start point for the synchronization of frames. Therefore, the following processing is performed to reduce the calculation time. The processing according to the present invention for employing phase to search for the frame start point is shown in FIG. 8. In the embedding system, at step 810 audio samples are divided into tentative frames. Then, at step 820 the frames are overlapped and at step 830 they are transformed into frequency components. At step 840 the phase of the synchronization signal mask data (it may be the same as that of a sign mask) is shifted, and data are embedded in each of the frames in the same direction using the same mask. At step 850 the inner product of the transformed frame and the shifted mask is calculated. At step 860 the location at which the inner product is the maximum is defined as the frame start point when information is embedded. If the absolute value of the inner product at that point is not the maximum, program control returns to step 840. Since the same signal is embedded in each frame, so long as audio samples have a width a multiple of the width at the time the signal is embedded, the detection system can detect the information merely by shifting the phase of the mask (step 840), even though the frame delimiter is shifted away from the frame delimiter when the signal is embedded. The shifting of the frames at a distance equivalent to v samples in the time domain means that a $2\pi kv/N$ phase shift is performed in the frequency domain, i.e., that the mask Ms(k) is replaced by Ms(k)$e^{j2\pi kv/N}$. Here, j defines an imaginary number unit.

Specifically, the frame start point when information is embedded is estimated by performing the following steps. (1) The samples Am(n) are collected in accordance with the tentative frame delimiters, and data for one frame $$A(n) = \sum_m A_m(n) \quad \text{Expression 28}$$

are synchronized. The resultant data are transformed into frequency components by an FFT, so that the frequency component f(k) is obtained.

(2) Instead of shifting the positions of the frame delimiters, the phase of the synchronization signal mask Ms(k) is shifted, and the inner product $$S_{ync}(v) = \sum_k C(F, k)\left(M_s(k)e^{\frac{j2\pi kv}{N}} \cdot F(k)\right) \quad \text{Expression 29}$$

is calculated for each set of v samples to obtain a "v" at which the maximum |Sync(v)| is obtained. Thus, it is assumed that when information is embedded the start point of the frame delimiters is located v samples ahead of the tentative delimiter start point.

The obtained Sync(v) can be used as a proxy for the inner product of the sign mask, with which the interpretation of the inner product of a mask for the bit mask is changed. Assuming that when information is embedded the tentative delimiter is at the estimated position, the predicted value for Sync(v) is $$S_{ync}(v) = \sum_k \lambda(k)C(F, k)a(k)|M(k)|^2\cos\left(\frac{2\pi kv}{N}\right) \quad \text{Expression 30}$$

wherein k(k) defines a fluctuation due to deterioration following embedding, and more nearly approaches 1 as the occurrence of deterioration is reduced. Since information embedded with a large modification tends to be lost during compression/decompression, a further approximate value for Sync(v) is obtained by calculating the following expression.

$$S_{ync}(v) = \lambda_{effective}\sum_{k=k_{\min}}^{k_{\max}}\cos\left(\frac{2\pi kv}{N}\right) \quad \text{Expression 31}$$

$$= \frac{\lambda_{effective}\cos\left(\frac{\pi(k_{\min}+k_{\max})v}{N}\right)\sin\left(\frac{\pi(k_{\max}+k_{\min}+1)v}{N}\right)}{\sin\left(\frac{\pi v}{N}\right)}$$

Specifically, it is ordinarily expected that Sync(v) will fluctuate around the adequate v, and that its resolution will be N/(kmax−kmin+1). Therefore, it is preferable that the frequencies at which the synchronization signal mask is not zero be distributed in a large domain, and that at the least the frequency for the bit mask should also be employed for the synchronization signal mask.

[Method for Estimating the Time Compression/expansion Ratio, Due to Embedding of a Signal Having an Aligned Phase]

Figure 9:
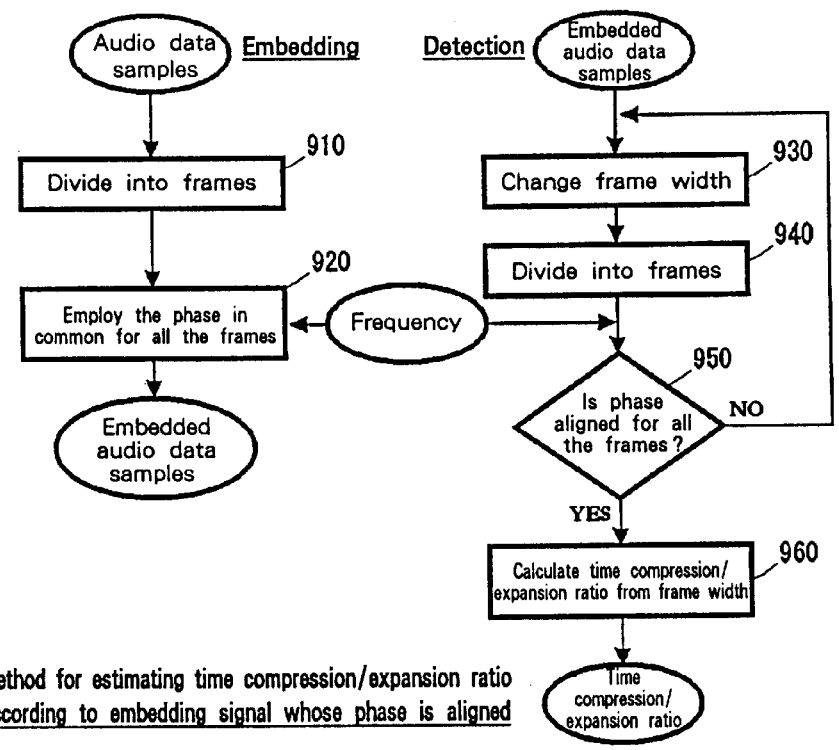
FIG. 9 is a flowchart showing the processing performed to estimate a time compression/expansion ratio due to the embedding of a signal for which the phase is aligned.

In FIG. 9 is shown the processing for estimating the compression/expansion ratio, due to embedding of a signal having an aligned phase. In the process for estimating the frame delimiting position when information was embedded, it is assumed that there is no compression or expansion of audio data in the time domain. The time compression/expansion ratio is estimated in the following manner to detect an embedded signal when the audio data are expanded or reduced in the time domain. The embedding system and the detection system are notified that one or a plurality of specific frequencies exist. At step 920 the embedding system transforms the frequency at a level that is imperceptible to human beings, so that for each frame the frequency has the same phase. Then, at step 930 the detection system changes the width of the frame. At step 950 the detection system determines whether the phase of the frequency, which has been modified by employing the modification of a frame width as the time compression/expansion ratio, is aligned for the individual frames. At step 960 the time compression/expansion ratio is defined by using the modification of the frame width whereat the phase of the frequency is aligned. Suppose that the sample frame width N' is defined as $A_m^{(N')}(n)=A_{N'm+n}$, and that a corresponding frequency component is defined as $$F_m^{(N')}(k) = \sum_{n=0}^{N'-1} A_m^{(N')}(n)e^{\frac{-j2\pi kv}{N'}} \quad \text{Expression 32}$$

If the frame width N is modified to frame width N' in the time domain, the $F_m^{(N)}(k)$ in the embedding process is only transformed into the $F_m^{(N')}(k)$ in the detection process. Therefore, the embedding system and the detection system are both cognizant of specific frequency ki, and the embedding system embeds information so that the phase $F_m^{(N)}$(ki)=|$F_m^{(N)}$(ki)| is matched as nearly as possible for all the frames m. The detection system modifies the frame width to obtain the frame width N' in which $$\left|\sum_m \frac{F_m^{(N')}(k_i)}{|F_m^{(N')}(k_i)|}\right| \quad \text{Expression 33}$$

is the maximum at frequency ki. The detection system employs the ratio N'/N to obtain the time compression/expansion ratio. When there are a plurality of frequencies ki that both systems are cognizant of, the frame width N' is calculated for which $$\sum_i \left|\sum_m \frac{F_m^{(N')}(k_i)}{|F_m^{(N')}(k_i)|}\right| \quad \text{Expression 34}$$

$$\prod_i \left|\sum_m \frac{F_m^{(N')}(k_i)}{|F_m^{(N')}(k_i)|}\right| \quad \text{Expression 35}$$

is the maximum, and the ratio N'/N is used to calculate the time compression/expansion ratio.

A modification of this processing will now be described. The embedding system and the detection system are notified that one or more specific frequencies exist. The embedding system modifies the frequency within a modification level that is imperceptible to human beings, so that for each frame the frequency has substantially the same phase and amplitude. The detection system modifies the width of the frame, and determines whether the phase of the frequency, which is modified by using the frame width change as the time compression/expansion ratio, is aligned for each frame. The time compression/expansion ratio is defined as the modification of the frame width in which the phase and amplitude are aligned the best.

Assume that the embedding system and the detection system both are cognizant of specific frequency ki. The embedding system embeds the information so that the frequency component $F_m^{(N)}(k_i)$ is matched as nearly as possible for all the frames m. The detection system changes the frame width to obtain the frame width N' in which $$\frac{\left|\sum_m F_m^{(N')}(k_i)\right|}{\sqrt{\sum_m \left|F_m^{(N')}(k_i)\right|^2}} \qquad \text{Expression 36}$$

is the maximum at the frequency ki, and employs the ratio N'/N to obtain the time compression/expansion ratio. If the both systems are cognizant of a plurality of frequencies ki, the frame width N' is calculated in which $$\sum_i \left|\frac{\sum_m F_m^{(N')}(k_i)}{\sqrt{\sum_m \left|F_m^{(N')}(k_i)\right|^2}}\right| \quad \text{or} \qquad \text{Expression 37}$$

$$\prod_i \left|\frac{\sum_m F_m^{(N')}(k_i)}{\sqrt{\sum_m \left|F_m^{(N')}(k_i)\right|^2}}\right| \qquad \text{Expression 38}$$

is the maximum, and the ratio N'/N is used to acquire the time compression/expansion ratio.

[Message Synchronization Method and System]

The message (additional information) must be repetitively embedded in audio data so that it can survive in the trimming of the audio data at any location. Therefore, when bit information is retrieved from the frame, the locations of the head and the end of the bits of the repetitive message must be estimated. That is, the head of the message in the embedding system and the head of the message in the detection system must be correctly synchronized.

[Method for Employing Frames for Delimiting the Interpretation of Bytes, Words, and a Message]

FIG. 11 is a conceptual diagram of the arrangement when frames are employed for delimiting the interpretation of bytes, words or a message. In order to insert delimiters for the interpretation of bytes, words and a message in detected bits, the embedding system embeds a synchronization signal in the same direction in all frames except the frame where a message embedding cycle starts, and either embeds a synchronization signal in the opposite direction in the frame where the message embedding cycle starts, or does not embed any signal. When a synchronization signal is embedded in a frame in a direction opposite to that of the others, or when no synchronization signal is embedded therein, the detection system assumes that frame is a frame where the message embedding cycle starts.

The synchronization signal may be embedded by using the frame synchronization signal mask or the sign mask. In this case, the frame synchronization signal or the sign signal is determined by using the sum of the inner products obtained for a sufficiently large number of frames, so that the affect imposed by the frames where the message embedding cycle starts can be ignored.

The embedding system embeds the same synchronization signal as often as possible in frames other than the frames where the message embedding cycle starts, and the detection system performs a statistical estimate to ascertain whether the synchronization signal of the detected frame falls in a range in which the synchronization signal of another frame is fluctuating, so that a reliable estimate can be acquired. The detection system is cognizant of the size of the interval separating the frames that are embedded by the embedding system, and searches through the interval of a frame that differs considerably from the others. Therefore, even when the synchronization signal is embedded with relatively small modification to maintain the sonic quality, the synchronization signal can be detected. So long as the embedding system and the detection system both are cognizant of the sizes of the intervals separating the frames, bit information either may be embedded or may not be embedded in a frame where the message embedding cycle starts.

[Method for Embedding a Plurality of Types of Information that Have Different Repetition Cycles]

When a plurality of types of information having different importance are to be embedded in audio data, their trimming robustness need not be the same. Important information should be frequently repeated and detected, even when a trimmed interval is short.

In order to embed and detect a plurality of types of information that have different trimming robustness, the embedding system and the detection system both are cognizant of the length of the bit unit employed for dividing the information, and the number of divisions. In the embedding process, the information is divided into lengths corresponding to that of the bit unit, and the divided bits are retrieved from the information and arranged to prepare information having the equal bit lengths (called synthesized units). The first bit of the first synthesized unit of information is embedded in the frame where the message embedding cycle starts, and the remaining bits are embedded in the succeeding frame.

For example, assume that the information bits are A, B and C and that they are divided as in $A_0 A_1$ $B_0 B_1 B_2$ $C_0 C_1 C_2 C_3$ \hfill Expression 39

The embedding system arranges the bits that are divided as in $A_0 B_0 C_0 A_1 B_1 C_1 A_0 B_2 C_2 A_1 B_0 C_3 A_0 B_1 C_0 A_1 B_2 C_1 A_0$
$B_0 C_2 A_1\ B_1 C_3 A_0 B_2 C_0 A_1 B_0 C_1 A_0 B_1 C_2 A_1 B_2 C_3$ \hfill Expression 40 and uniformly embeds a plurality of information sets to be detected and that have different repetition cycles. The first bit of each ApBqCr is embedded in the frame where the message embedding cycle starts. In FIG. 10 is shown one difference between the method of the present invention and the method of the conventional method when information sets that have different repetition cycles are embedded.

[Method for Estimating the Start Point of a Message by Adding Specific Bits]

Assume that the embedding system and the detection system both are cognizant of specific bits (called delimiting bits) that are longer than are the bits of additional information and that do not employ cyclic shifting to match themselves. "The bits do not employ cyclic shifting to match themselves" means that the bits are embedded repeatedly and only when they are trimmed at the original delimiter can the original bits be reproduced. For example, "00100010"

can be retrieved either when delimiter "," is inserted following each repetition, as in 00100010,00100010,00100010,00100010, . . . , or when "," is inserted as in 0010,00100010,00100010, 00100010,0010 . . .

Therefore, the "00100010" can not be employed as delimiting bits. While "00100010" internally contains the repeated "0010," generally bits that include an internal cycle employ cyclic shifting to match themselves, and can not be used as delimiting bits. On the other hand, "00100011," which does not include an internal cycle can be used as delimiting bits because only with a specific delimiter the original bits can be retrieved from the repeated bits.

In addition, assume that the embedding system and the detection system are both cognizant of the method employed for determining whether delimiting bits have been added to the bits by an exclusive-OR (XOR) operation. For example, for the delimiting bits "00100011," whether the delimiting bits have been XORed can be determined by examining the value of the last bit. The determination method is not unique, and in this example, whether the sum of the bits for all the digits is an odd number or an even number can be employed for the determination. FIG. 12 is a diagram for explaining the method used for estimating the start point of a message by adding specific bits.

The embedding system adds one or more bits to the bits of additional information, prepares expanded bits that are as many as the delimiting bits, and embeds in audio data the expanded bits, as well as the delimiting bits which have been added to every other frame by the performance of an XOR operation. The additional bit is employed to determine whether the delimiting bits have been added.

By employing an XOR operation, the detection system adds to detected bits the same bits that are shifted a distance equivalent to the length of the delimiting bits, and searches the obtained bits for the delimiters which enable the obtained bits to match the delimited bits. If such delimiters are found, they are defined as the locations of the delimiters in the detected bits. If no such delimiters are found, it is assumed that an error occurred when the bits were detected. Since delimiting bits have been added to every other frame in the delimited bits, bits to which nothing has been added are determined by employing an additional bit, and are defined as retrieved bits.

Assume that "00100011" are delimiting bits, and that the additional information in the embedding system is seven bits "1101101." One "0" bit is added to the additional information, and the obtained expanded bits "11011010" are repeatedly embedded. At this time, through an XOR operation the delimiting bits are added to every other frame and are embedded every other embedding repetition:

11011010,11111001,11011010,11111001,11011010, 11111001, . . .

In the above example, the delimiter "," is inserted to make the separations easy to see; actually, however, only a bit value of 0 or 1 is embedded in each frame.

Then, suppose that the first three bits of the above sequence are lost due to a process that follows the embedding, and the detection system detects the following bits:

11010,11111001,11011010,11111001,11011010, 11111001, . . .

These bits are shifted a distance equivalent to the number of the delimiting bits, and the obtained bits 11001,11011010,11111001,11011010,11111001, 11011010, . . .

are added by employing the XOR operation. Then, the resultant bits are 00011,00100011,00100011,00100011,00100011, 00100011, . . .

Since the obtained bits match the delimiting bits "00100011", only this delimiter is correct. Then, expanded bits having the additional "0" bit are selected at each delimiter, and the bits "1101101" are obtained as additional information.

[Method for Estimating the Start Point of a Message While Taking into Account the Reliability of the Detection Performed in a Frame]

FIG. 13 is a diagram for explaining a method for estimating the start point of a message while taking into account the reliability of the detection performed in a frame. In order to estimate the start point of a message while taking into account the reliability of the detection performed in a frame, the detection system calculates the inner products of the bit mask for two corresponding frames that are determined in accordance with the length of the delimiting bits. The inner products are multiplied by the sign defined in the delimiter bits. Then, a delimiter is searched for at which the sum of the inner products in the succeeding frame is the maximum. Assume that the delimiting bits are defined as {B(m)} and the length is defined as M, and that the inner product in each frame obtained by using the bit mask is defined as Xb(m). Then, $$P(v) = \sum_{m=0}^{M-1} (-1)^{B(m-v)} X_b(m) X_b(m+M) \qquad \text{Expression 41}$$

is calculated to obtain the "v" at which the sum is the maximum, and its location is defined as the start point of the message. When the value of the subscript of the delimiting bit exceeds the original range, assume that the range is expanded as B(m+M)=B(m), and that $(-1)^0=1$ and $(-1)^1=-1$. According to this method, even when a bit error occurs in the individual frames, the start point of the message can be obtained.

Once the start point of the message has been obtained, the bit information is calculated by using the sign of $$X(m) = \sum_{r} (-1)^{p(r)B(m)} X_b(\gamma M + m + v) \qquad \text{Expression 42}$$

that is accumulated concerning the repetitions. Here p(r) is 1 for the repetitions with the delimiting bit being added, or is zero for the repetitions with out the delimiting bit being added.

[Method for Estimating the Start Points of a Plurality of Messages by Adding Specific Bits]

In order to embed information sets having different cycles, specific bits that do not match themselves by cyclic shifting (called a delimiting bit segment) are added by an exclusive-OR operation and are embedded, so that the start point of the message can be detected.

The meaning of "The bits do not match themselves by shifting" is as follows. When arbitrary shift v (0<v<M) is performed for bits {B(m)} having a length M, m, where B(m)≠B(m+v) is established, is always present in a range of 0≦m≦m+v≦M-1. For example, "01011011101111" and "010011000111" are example bits that do not match themselves by shifting.

Assume that the embedding system and the detection system are notified that there are bits of additional information to be repetitively embedded at short intervals, and that there is a delimiting bit segment that is longer than the bits of the additional information and that is to be repetitively embedded at longer intervals. The embedding system adds a bit to the bits that are repetitively embedded at short intervals, and prepares expanded bits that are as long as the delimiting bit segment. Furthermore, the embedding system adds the other bits to the obtained bits to prepare a synthesizing bit unit. To embed the synthesized bit units in order, the embedding system embeds the delimiting bit segment in the expanded bits by performing an exclusive-OR operation. The additional bit is employed to determine whether the delimiting bit segment is added.

By employing the XOR operation, the detection system adds to the synthesized bit unit, the same detected bits after they have been shifted the equivalent of the length of the bits. Then, the detection system searches for the delimiter whereat the bits correspond to the delimiting bits. If the delimiter is found, it is defined as the location of the delimiting of the detected bits. If the delimiter is not found, it is assumed an error occurred when the bits were detected. Since at every other delimiter the delimiting bit segment is added to the delimited bits, the additional bit is employed to determine bits to which nothing was added, and that bits are defined as retrieved bits.

Assume that "00110111" is a delimiting bit segment, and the additional information having a short cycle is seven bits, "1101101." The embedding system adds one bit "0" to prepare the expanded bits "11011010." And then the bits "*****" of the other additional information having a long cycle are attached to the expanded bits, so that the bits that constitute the synthesized unit are obtained as "11011010*********." The asterisk, "*," can be either 0 or 1. When the synthesized bit unit is to be embedded, the delimiting bit segment is XORed and embedded at the location of every other expanded bit. Thus,

11011010***,11101101***,11011010***, 11101101* , ...**

are embedded for each frame. While the delimiter "," is inserted in this case, actually only the bit value 0 or 1 is embedded in the frame.

Assume that the first three bits are lost from the above sequence due to the processing performed following the embedding, and that the detection system can detect the following bits.

11010***,11101101***,11011010***, 11101101***,

When these bits are shifted the equivalent of the length of the synthesized bit unit, and the obtained bits

01101***,11011010***,11101101***, ...

are XORed and added. Then, the resultant bits are

10111***,00110111***,001101111***, . .

Figure 14:
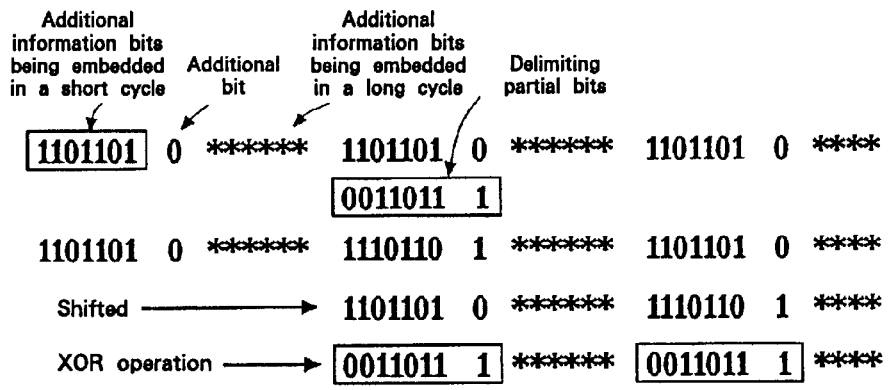
FIG. 14 is a diagram for explaining the method used for estimating the start points of messages by adding specific bits.

Regardless of the values of "****," this is shorter than the length of the delimiting partial bit segment, so that this sequence can neither match the bits "00110111" nor match itself by shifting. Thus, it is apparent that only the delimiter used for embedding matches "00110111." Then, when the expanded bits having the additional "0" bit are selected at each delimiter, it is found that the bits of the additional information having the short cycle are "1101101." Similarly, a short bit sequence "******" that is attached to the additional information is detected. And the delimiting bit segment having a corresponding length is employed, so that the start point of the additional information can be detected. In FIG. 14 is shown the method used for estimating the start points of a plurality of messages by adding the above specific bits.

[Embedding a Sign that is not Affected by the Cyclic Shifting]

The embedding system and the detection system are notified of the number of frames of one cycle where the additional information is assumed to be embedded repeatedly. A set of bits that are rendered equal to each other by cyclic shifting are regarded as having the same values, and bits that have a different value correspond to different additional information. In this manner, the system can embed information and detect the embedded information without being cognizant of where the cycle of bits starts.

Bits that are not rendered equal to each other by cyclic shifting are, for example, {00000},{00001}{00011},{00101},{00111},{01011}, {01111}, {1111 1}.

Figure 15:
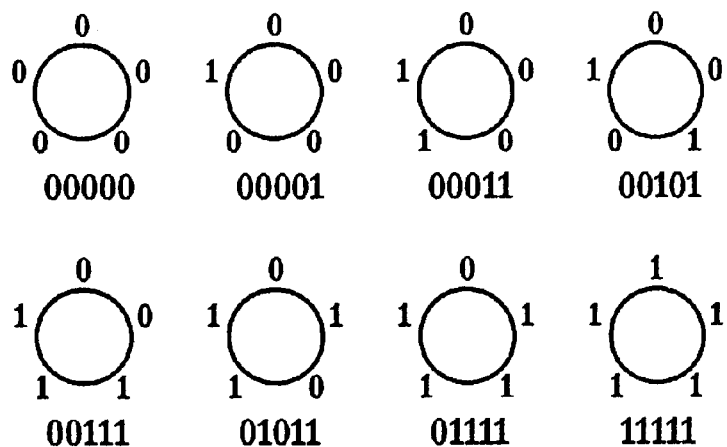
FIG. 15 is a diagram showing an example in which sequences having 5-bit lengths are employed to embed 3-bit information.

The sequences of five bits each can be employed to represent eight states, i.e., 3-bit information. In FIG. 15 is shown an example for employing the above sequences having 5-bit lengths to embed 3-bit information. Assume that S(M) is defined as the number of bits of bit length M that are not rendered equal to each other by cyclic shift. Then, $$S(p) = 2 + \frac{(2^{p-2})}{p} \qquad \text{Expression 43}$$

$$S(p^{m+1}) = S(p^m) + \frac{(2^{p^{m+1}} - 2^{p^m})}{p^m} \qquad \text{Expression 44}$$

are established for prime number p. For p and q that are relative prime numbers, $$S(pq) = S(p) + S(q) + \frac{(2^{pq} - 2^p - 2^q)}{(pq)} \qquad \text{Expression 45}$$

is established.

Figure 1:
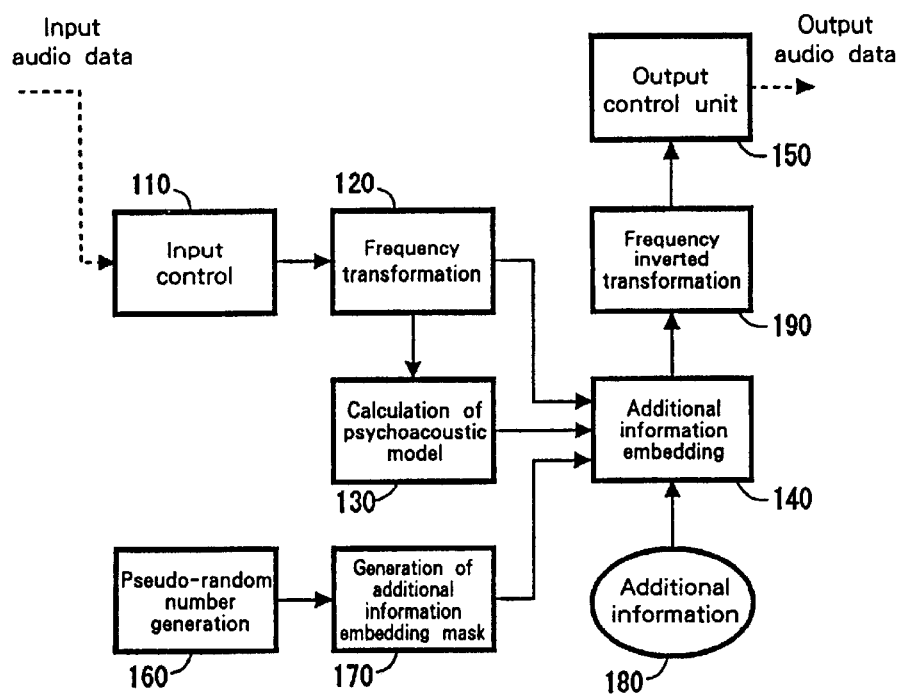
FIG. 1 is a block diagram illustrating an additional information embedding apparatus according to the present invention.

The preferred embodiment of the present invention will now be described while referring to FIGS. 1 to 3. FIG. 1 is a block diagram illustrating an additional information embedding apparatus according to the present invention. An input control block 110 transmits, to a frequency transformation block 120, received audio signals as sample values that are arranged in a time series. When the input signal is analog, it is converted into a digital signal. When the input signal is digital, its format is translated and audio samples are transmitted to the block 120.

The frequency transformation block 120 calculates the frequency components of an audio signal. The block 120 receives a digital audio signal from the block 110, and calculates the frequency components in the signal interval.

A psychoacoustic model calculation block 130 employs the hearing response of human beings to calculate a level in which a modification is difficult to identify. The block 130 receives the transformed audio signal from the block 120, and calculates, for each frequency component, the affect it has on hearing.

A pseudo-random number generation block 160 generates pseudo-random numbers consisting of 0 and 1. The generated pseudo-random numbers are transmitted to an additional information embedding mask generation block 170.

The additional information embedding mask generation block 170 employs the received pseudo-random numbers to generate a mask used to embed additional information. The block 170 correlates the pseudo-random numbers with the phase direction, and generates a two-dimensional vector (mask) on a complex number plane that defines, for each frequency, the phase of an embedded signal.

Additional information 180 is transmitted as bit information to an additional information embedding block 140. As needed, a bit for the detection of message synchronization is inserted into the bits, and the bits are inverted.

The additional information embedding block 140 embeds imperceptible additional information in an audio signal. Based on the psychoacoustic model obtained by the block 130, in the direction of the masks obtained by the block 170, the block 140 adds, within an imperceptible level, a signal and a synchronization signal used for time compression/expansion detection to the audio signal transformed by the block 120. As a result, the statistical value of the frequency components of the audio signal is a sign that is defined in accordance with the bit information carried in the additional information 180.

A frequency inverted transformation block 190 invertedly transforms the above audio signal. The block 190 invertedly transforms the audio signal in which the additional information is embedded by the block 140, and calculates audio samples that are arranged in a time series.

An output control block 150 outputs the audio samples as audio data. The block 150 performs DA conversion of the audio samples received by the block 190, or adds header information as a file to the audio samples, and outputs the resultant audio signal.

Figure 2:
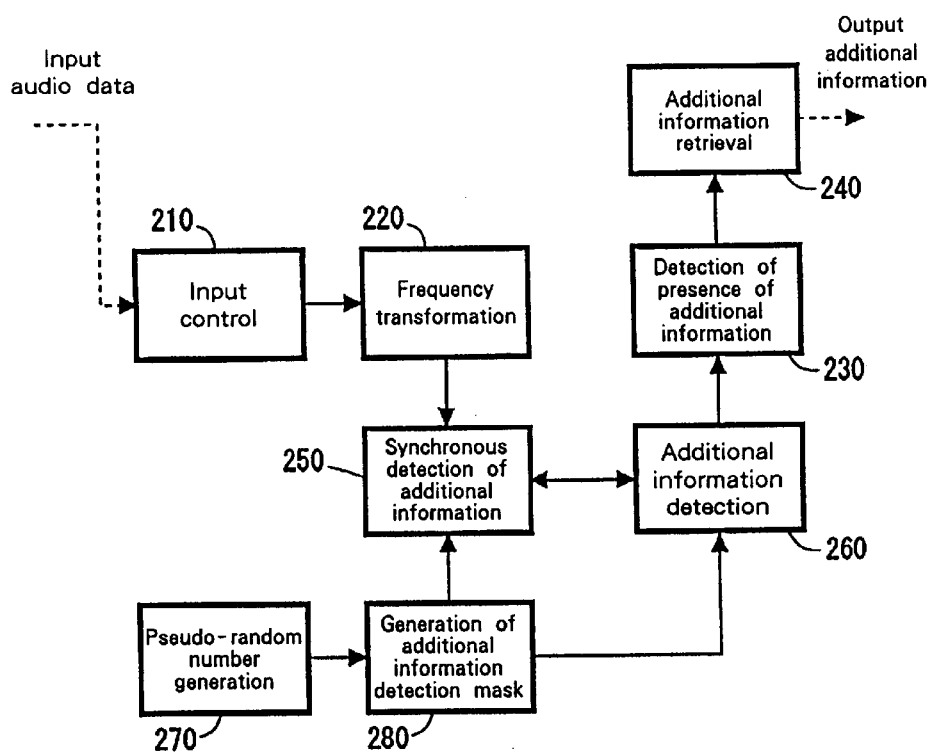
FIG. 2 is a block diagram illustrating an additional information detection apparatus according to the present invention.

FIG. 2 is a block diagram illustrating an additional information embedding apparatus according to the present invention. An input control block 210 transmits, to a frequency transformation block 220, received audio signals as sample values arranged in a time series. When the input signal is analog, it is converted into a digital signal. When the input signal is digital, its format is translated and audio samples are transmitted to the block 220.

The frequency transformation block 220 calculates the frequency components of an audio signal. The block 220 receives a digital audio signal from the block 210, and calculates the frequency component for the signal interval.

While assuming that additional information is embedded in an audio signal, an additional information synchronization detection block 250 calculates the time compression/expansion ratio of a received audio signal, and detects the start point of an additional information embedding process unit (a frame). The block 250 measures the time compression/expansion ratio of the synchronization signal to detect the time compression/expansion ratio of the audio signal transformed by the block 220. Then, while rotating an additional information detection mask received from an additional information detection mask generation block 280, the block 250 calculates the inner product of the mask and the audio signal whose time compression/expansion ratio is compensated for. The block 250 detects a shifting of the frame start point by employing the rotation angle of the mask at which the inner product is the maximum.

A pseudo-random number generation block 270 generates pseudo-random numbers consisting of 0 and 1. The generated pseudo-random numbers are transmitted to an additional information detection mask generation block 280.

The additional information detection mask generation block 280 employs the received pseudo-random numbers to generate a mask that is used to detect additional information. The block 280 correlates the pseudo-random numbers with the phase direction, and generates a two-dimensional vector (a mask) on a complex number plane that defines, for each frequency, the phase of an embedded signal.

An additional information detection block 260 detects additional information embedded in the audio signal. The block 260 calculates as a statistical value the inner product of the transformed audio signal, for which the time compression/expansion ratio is obtained by the block 250 and the frames are synchronized, and the additional information detection mask obtained by the block 280. If the synchronization of frames must be performed again because of the obtained statistical value, a re-synchronization signal is transmitted to the block 250 to detect the synchronization of additional information.

An additional information presence detection block 230 employs the obtained statistical value to determine whether additional information is embedded in the audio signal. In order to determine whether the information is intentionally embedded in the audio signal, the block 230 determines whether the statistical value obtained by the block 260 is satisfactorily large.

An additional information reproduction block 240 reproduces the detected bit information as additional information. When the block 230 determines that the additional information has been embedded, the block 240 correlates the sign affixed to the statistical value with the bits and translates it as bit information. The block 240 then examines the detected bit information to detect a start bit of the additional information, and shifts the detected bit information in accordance with the start bit. When bits are inserted/inverted for the synchronization of a message, the block 240 removes/inverts these bits, and retrieves the additional information.

Figure 3:
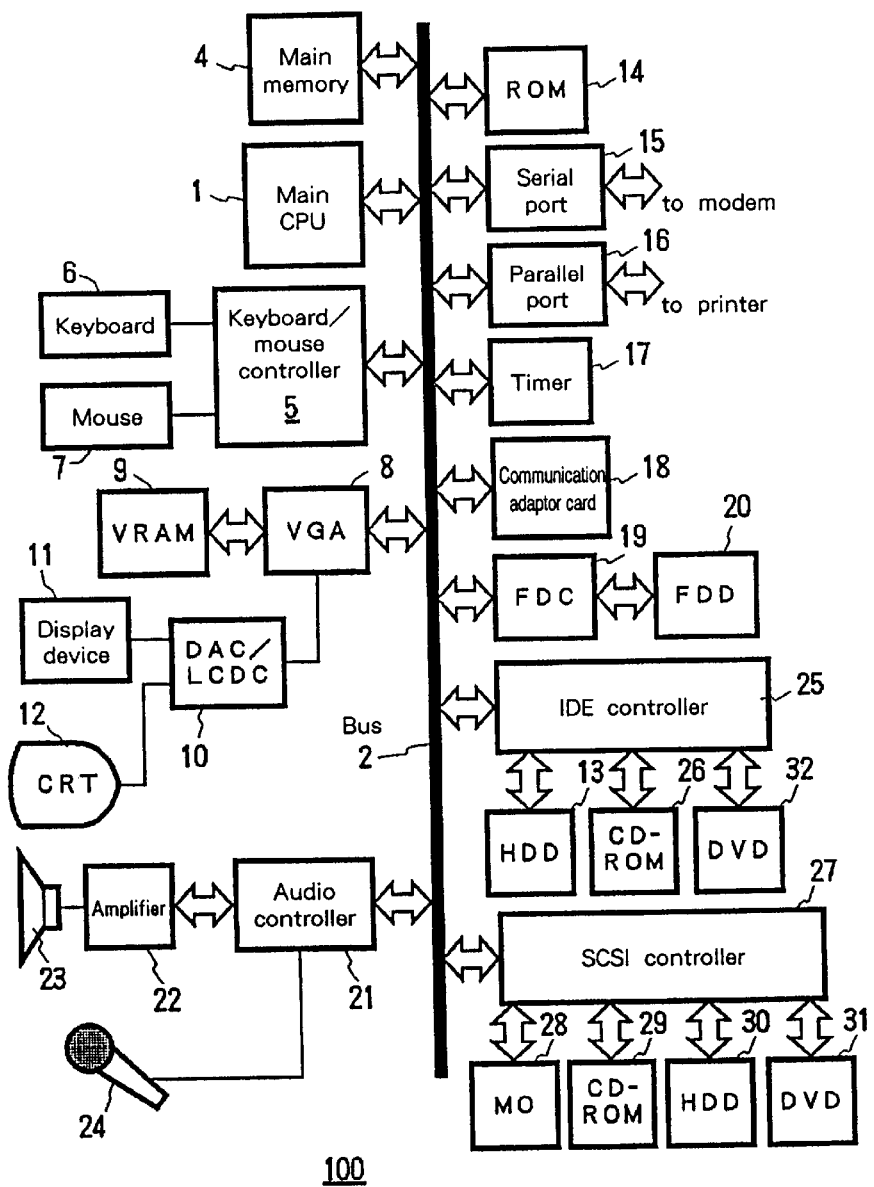
FIG. 3 is a diagram illustrating an example hardware arrangement of a system used for embedding/detecting additional information.
Figure 4:
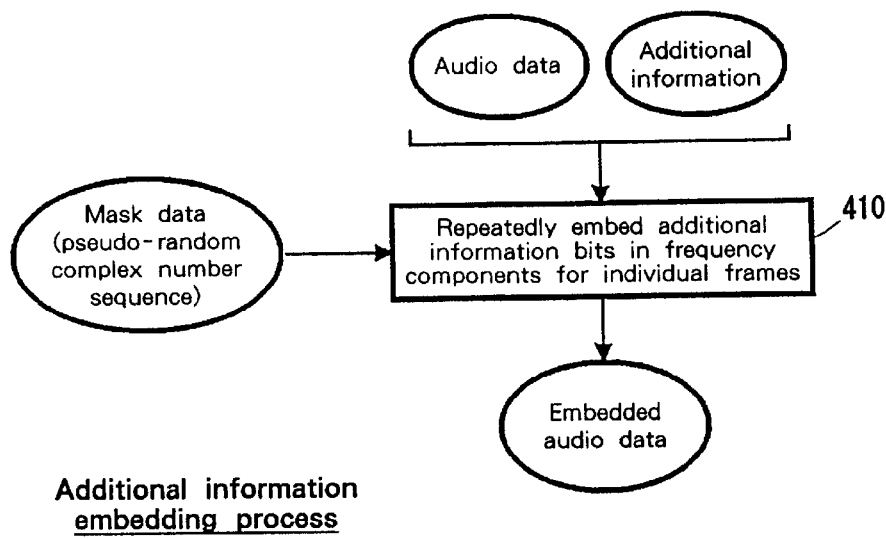
FIG. 4 is a flowchart showing the additional information embedding processing performed according to the present invention.
Figure 5:
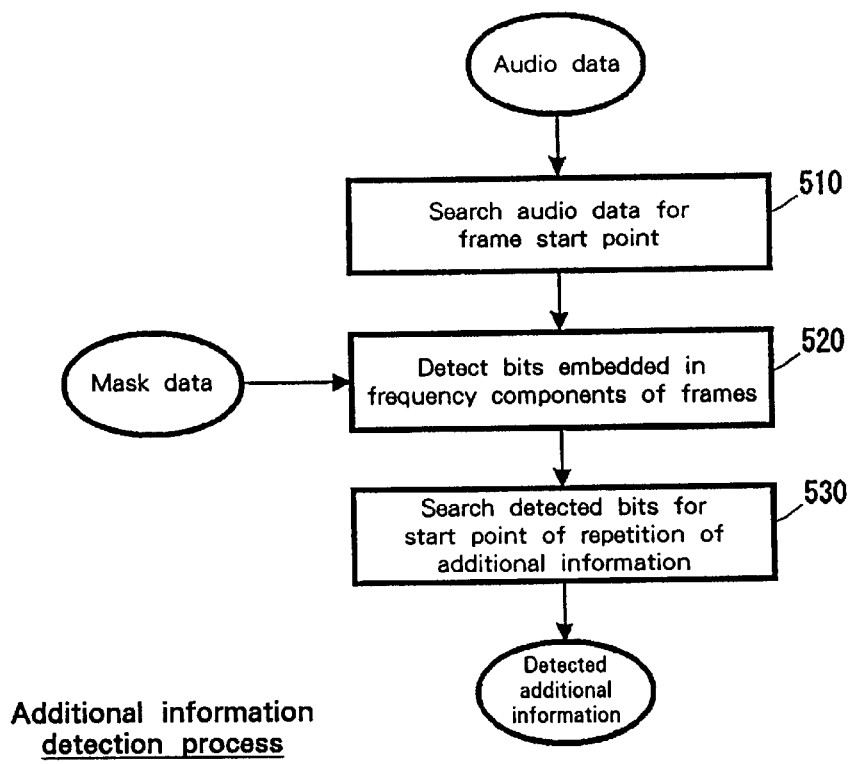
FIG. 5 is a flowchart showing the additional information detection processing performed according to the present invention.

In FIG. 3 is shown the general hardware arrangement for a system according to the present invention that is employed for embedding/detecting additional information. A system 100 comprises a central processing apparatus (CPU) 1 and a memory 4. The CPU 1 and the memory 4 are connected by a bus 2 and an IDE controller 25 to a hard disk drive 13 (or to a storage medium drive, such as an MO, a CD-ROM 26 or a DVD 32), which is an auxiliary storage device. Similarly, the CPU 1 and the memory 4 are connected by the bus 2 and a SCSI controller 27 to a hard disk drive 30 (or to a storage medium drive, such as an MO 28, a CD-ROM 29 or a DVD 31), which is an auxiliary storage device, while a floppy disk drive 20 is connected to the bus 2 via a floppy disk controller 19.

A floppy disk is inserted into the floppy disk drive 20, and code or data for a computer program, which interacts with an operating system and issues instructions to the CPU 1 for embedding or detecting additional information to implement the present invention, can be stored on the floppy disk or on the hard disk drive 13 (or on the MO, the CD-ROM 26 or the DVD 32), and in a ROM 14. This computer program is executed by loading it into the memory 4. The code for the computer program can be compressed, or can be divided into a plurality of segments for storage on a plurality of storage mediums.

The system 100 further comprises user interface hardware components such as a pointing device (a mouse or a joystick) 7 and a keyboard 6 for entering data, and a display device 12 for providing visual data for a user. Furthermore, a printer can be connected to the system 100 via a parallel port 16, or a modem can be connected via a serial port 15. For communicating with another computer, the system 100 can be connected to a network via the serial port 15 and a modem, or via a communication adaptor 18 (an ethernet or a token ring card). Additional information to be embedded can be fetched from an external network via the communication adaptor 18, or reproduced additional information can be transmitted externally via the network. A remote transceiver is connected to the serial port 15, or to the parallel port 16, for exchanging data with the system 100 using infrared rays or wires.

A loudspeaker 23 is used to receive, via an amplifier 22, an audio signal produced by D/A conversion (digital/analog conversion) performed by an audio controller 21, and to output the signal as sound. The audio controller 21 performs the A/D (analog/digital) conversion of audio information received via a microphone 24 in order to introduce external audio data as additional information to be embedded into the system 100.

As is described above, it would be easily understood that the system 100 of the present invention can be provided by an average personal computer (PC); a workstation, a notebook PC or a palmtop PC; a network computer, a television set or another electric home appliance that incorporates a computer; a game machine having a communication function; a communication terminal having a communication function, such as a telephone, a facsimile machine, a portable telephone, a PHS or a PDA; or a combination of the components described above. It should be noted, however, that these components are merely examples and not all of them are required for the present invention. The additional information embedding/detection blocks in FIGS. 1 and 2 may be constituted by dedicated hardware components.

According to the present invention, provided are a method and a system for so embedding additional information, such as copyright information, in audio data that a modification in the sonic quality due to the embedding is imperceptible to human beings, and for maintaining the embedded information and precisely detecting it after processing of the audio data has been performed that does not drastically deteriorate the sonic quality. Therefore, copyrighted music recordings that are distributed on CDs or via the Internet can be protected, high quality recorded music can be safely supplied as digital data, and the musical culture can be stably supported.

It should be understood that the scope of the present invention is not limited to the described embodiment but includes those changes within the spirit and scope of the appended claims.

We claim:

1. A system for embedding additional information in audio data, comprising:

(a) means for transforming said audio data into frequency components including means for dividing audio data to multiple frames consisting of multiple audio samples, and for transforming audio data in said frames;

(b) means, based on said audio data, for determining levels of modification for each frequency component within which said additional information can be embedded is for analyzing frequency component distribution of said transformed audio data to determine said levels of modification for each frequency component that are aurally imperceptible to human beings;

(c) means for generating a mask to use for embedding said additional information;

(d) means for employing said mask to be fit within the modification levels determined for said transformed audio data, and for adding the pattern to said transformed audio data wherein said embedding mask is a pseudo-random vector that is produced from a pseudo-random number generated by a pseudo-random number generator, and that defines a manipulation direction for each frequency component; and (e) means for, to obtain audio data, performing inverse transformation for said modified audio data in which said additional information has been embedded.

2. The system according to claim 1, wherein said means, for embedding said additional information, is means for embedding additional information by changing frequency components within said frequency modification levels in which frequency components are changed for embedding additional information, so that in accordance with said additional information the inner products obtained by multiplying said pseudo-random vector by the frequency components of said transformed audio data in said frames have specific signs or constitute specific values.

3. The system according to claim 2, further comprising, means for providing limitations on generating said embedding mask and on changes to said frequency components in each frame, so that in two successive frames the value of the last sample in the first frame obtained after the inverse transformation has been performed is substantially equal to the value of the first sample in the second frame obtained after the inverse transformation has been performed.

4. The system according to claim 2, wherein said means, for embedding said additional information, includes means for embedding multiple items of information by dividing frequency components into multiple sets of small frequency bands in a frame so that frequency ranges for each set of the bands are almost the same, and by using multiple orthogonal embedding masks for which all the inner products are zero.

5. The system according to claim 2, wherein said means, for embedding said additional information, further includes means for embedding a synchronization signal, and wherein said means for embedding said synchronization signal includes means for changing the phases or the amplitudes of frequency components of said frames in order for said phases and said amplitudes to match each other.

6. The system according to claim 2, wherein said means, for embedding said additional information, includes means for embedding in said frames synchronization signals having the same signs, and either embedding synchronization signals having opposite signs in delimiting frames or embedding nothing therein.

7. The system according to claim 2, wherein said means, for embedding said additional information, includes means for dividing additional information into division bit units, and for embedding a first division unit in a delimiting frame and the remaining bits in the following frames.

8. The system according to claim 2, wherein said means, for embedding said additional information, includes means for repetitively embedding additional information, and wherein said repetitive embedding means divides additional information into said division bit units, adds one or more bits to each of said division bit units to form expanded bits, and employs an exclusive-OR operation to embed delimiting bits in every other sets of expanded bits.

9. The system according to claim 2, wherein said means, for embedding said additional information, includes means for adding delimiting bits to bits of additional information, and for employing an exclusive-OR operation to embed expanded bits in every other division bits.

10. The system according to claim 2, wherein said means, for embedding said additional information, includes means for embedding bits that correspond to additional information as a cycle of bits that are rendered equal to each other by cyclic shifting.

11. The system according to claim 1, wherein said means, for embedding said additional information, is means for embedding additional information by changing, to the maximum extent possible, frequency components within said frequency modification levels in which frequency components are changed for embedding additional information, so that in accordance with said additional information the inner products produced by multiplying said pseudo-random vector and frequency components of said transformed audio data in said frames have specific signs or constitute specific values.

12. The system according to claim 1, wherein said means for performing inverse transformation for said audio data transformed to frequency components is means for transforming, into multiple audio samples, frequency components including frequency components changed for embedding additional information.

13. A system for detecting additional information that has been embedded in audio data, comprising:
  (a) means for transforming said audio data into frequency components;
  (b) means for generating a detection mask wherein said mask is a pseudo-random vector that is produced by a pseudo-random number generated by a pseudo-random number generator;
  (c) means for synchronizing said transformed audio data to detect additional information; and
  (d) means for employing said mask to synchronously detect in said transformed audio data bits belonging to said additional information.

14. The system according to claim 13, wherein said means for transforming said audio data into frequency components comprises means for dividing audio data to multiple frames consisting of multiple audio samples, and for transforming audio data in said frames.

15. The system according to claim 13, wherein said detection mask used for detection is substantially the same as an embedding mask.

16. The system according to claim 13, wherein said means, for detecting said additional information, is means for calculating inner products by multiplying frequency components into which said frames are transformed, by said pseudo-random vector, and for detecting additional information by using the signs or values obtained for said inner products.

17. The system according to claim 16, wherein said inner products are calculated by multiplying a frequency-dependent constant, which is determined based on frequency distribution, by inner products produced by multiplying frequency components, into which said frames are transformed, and said pseudo-random vector.

18. The system according to claim 16, wherein said means, for detecting said additional information, includes means for changing the value of another detection mask in accordance with the obtained inner products.

19. The system according to claim 16, wherein said means, for detecting said additional information, improves the reliability for the detection of additional information by obtaining the sum of said inner products of said frames having the same signs, or alternately using the opposite signs.

20. The system according to claim 19, wherein said means, for detectiing said additional information, includes means for employing the result obtained when, in order to ascertain whether audio data is marked or unmarked, a determination is made as to whether an absolute value for the total of said inner products is greater than a threshold value.

21. The system according to claim 16, wherein said additional information detection means includes, in advance, a specific frequency, a phase, an amplitude, a frame separation synchronization signal, the length of each division bit unit for dividing additional information and the number of divided segments, or information for bits used as a delimiter.

22. The system according to claim 16, wherein said means for transforming said audio data into frequency components includes means for changing the width of a frame, for determining whether the phase or the amplitude of a frequency, which is changed while the changing of the frame width constitutes a time compression/expansion ratio, is aligned for each frame, and for determining said time compression/expansion ratio in accordance with the change in the frame width at which the alignment of the phase and the amplitude is the best.

23. The system according to claim 16, wherein said means, for transforming said audio data into frequency components, includes means for shifting said start point to obtain the phase of a frequency at which information has been embedded, and for specifying the start point of a frame when said information has been embedded therein.

24. The system according to claim 16, further comprising:
  (5) means for specifying, from the bit of said additional information, a synchronization signal indicating the start or the end point of repeated bits, in order to reproduce said additional information,
  wherein, said specifying means includes means for specifying a sign of frames as a different frame of another sequential frames or specifying frames not including a sign of frames as delimiting frames.

25. The system according to claim 16, wherein said means, for detecting said additional information, includes means for employing said delimiting bits to designate a delimiting position of bits that constitute additional information, and for reproducing said bits that constitute said additional information.

26. The system according to claim 16, wherein, in order to reproduce said additional information, said means for detecting additional information includes means for searching for delimiting bits, and for retrieving bits to which expanded bits have not been added.

27. The system according to claim 16, wherein said means, for detecting said additional information, includes means for regarding, as having the same value, bits that are rendered equal by the cyclic shifting of bits, and for correlating, with additional information, bits that are not equal, so that said additional information can be retrieved without notification being given of the starting point of bits when said additional information has been embedded.

28. The system according to claim 13, wherein said synchronization detection means is means for transforming, into frequency components, data in one frame that has been obtained by overlapping said multiple frames, for calculating the inner product of the obtained data and a mask whose phase has been shifted, and for specifying the start point of a frame that is to be embedded by employing the phase shift at which the absolute value of said inner product is the maximum.

29. A method for embedding additional information in audio data, comprising the steps of:
  (a) transforming said audio data into frequency components;
  (b) based on said audio data, determining levels of modification for each frequency component within which said additional information can be embedded;
  (c) generating a mask to use for embedding said additional information wherein said mask is a pseudo-random vector that is produced from a pseudo-random number generator and that defines a manipulation direction for each frequency component;
  (d) employing said mask to be fit within the modification levels determined for said transformed audio data, and for adding the pattern to said transformed audio data; and (e) to obtain audio data, performing inverse transformation for said modified audio data in which said additional information has been embedded.

30. A method for detecting additional information that has been embedded in audio data, comprising the steps of:

(a) transforming said audio data into frequency components;

(b) generating a detection mask wherein said mask is a pseudo-random number generated by a pseudo-random number generator;

(c) synchronizing said transformed audio data to detect additional information; and (d) employing said mask to synchronously detect in said transformed audio data bits belonging to said additional information.

31. A storage medium for storing a program for embedding additional information in audio data, said program comprising:

(a) a function for transforming said audio data into frequency components;

(b) a function for, based on said audio data, determining levels of modification for each frequency component within which said additional information can be embedded;

(c) a function for generating a mask to use for embedding said additional information wherein said embedding mask is a pseudo-random vector that is produced from a pseudo-random number generated by a pseudo-random number generator, and that defines a manipulation direction for each frequency component;

(d) a function for employing said mask to be fit within the modification levels determined for said transformed audio data, and for adding the pattern to said transformed audio data; and (e) a function for, to obtain audio data, performing inverse transformation for said modified audio data in which said additional information has been embedded.

32. A storage medium for storing a program for detecting additional information that has been embedded in audio data, said program comprising:

(a) a function for transforming said audio data into frequency components;

(b) a function for generating a detection mask, and for synchronizing said transformed audio data to detect additional information wherein said mask is a pseudo-random vector that is produced from a pseudo-random number generated by a pseudo-random number generator; and (c) a function for employing said mask to synchronously detect, in said transformed audio data, bits belonging to said additional information.

33. A computer program product, on a computer usable medium, usable with a computer for embedding additional information in audio data, said software program product, comprising:

(a) software for transforming said audio data into frequency components;

(b) software for determining levels of modification for each frequency component within which said additional information can be embedded, based on said audio data;

(c) software for generating a mask to use for embedding said additional information wherein said mask is a pseudo-random vector that is produced from a pseudo-random number generated by a pseudo-random number generator and that defines a manipulation direction for each frequency component;

(d) software for employing said embedding mask to be fit within the modification levels determined for said transformed audio data, and for adding the pattern to said transformed audio data; and (e) software for performing inverse transformation for said modified audio data in which said additional information has been embedded to obtain the audio data.

34. A computer program product, on a computer usable medium, usable with a computer for detecting additional information that has been embedded in audio data, said computer software product comprising:

(a) software for transforming said audio data into frequency components;

(b) software for generating a detection mask wherein said mask is a pseudo-random vector that is produced by a pseudo-random number generated by a pseudo-random number generator;

(c) software for synchronizing said transformed audio data to detect additional information; and (d) software for employing said detection mask to synchronously detect in said transformed audio data bits belonging to said additional information.

35. The computer program product according to claim 34, wherein said software for transforming said audio data into frequency components is for dividing audio data to multiple frames consisting of multiple audio samples, and for transforming audio data in said frames.

36. The computer product according to claim 34 wherein said detection mask used for detection is substantially the same as an embedding mask.

37. The computer program product according to claim 36, wherein said software, for detecting said additional information, includes software for changing the value of another detection mask in accordance with the obtained inner products.

38. The computer program product according to claim 37, wherein said software, for detecting said additional information, includes software for employing the result obtained when, in order to ascertain whether audio data is marked or unmarked, a determination is made as to whether an absolute value for the total of said inner products is greater than a threshold value.

39. The computer program product according to claim 36, wherein said software, for detecting said additional information, improves the reliability for the detection of additional information by obtaining the sum of said inner products of said frames having the same signs, or alternately using the opposite signs.

40. The computer product according to claim 34, wherein said software, for detecting said additional information, is for calculating inner products by multiplying frequency components into which said frames are transformed, by said pseudo-random vector, and for detecting additional information by using the signs or values obtained for said inner products.

41. The computer program product according to claim 40, wherein said inner products are calculated by multiplying a frequency-dependent constant, which is determined based on frequency distribution, by inner products produced by multiplying frequency components, into which said frames are transformed, and said pseudo-random vector.

42. The computer program product according to claim 40, wherein the additional information detection software includes, in advance, a specific frequency, a phase, an amplitude, a frame separation synchronization signal, the length of each division bit unit for dividing additional information and the number of divided segments, or information for bits used as a delimiter.

43. The computer program product according to claim 40, wherein said software for transforming said audio data into frequency components includes software for changing the width of a frame, for determining whether the phase or the amplitude of a frequency, which is changed while the changing of the frame width constitutes a time compression/expansion ratio, is aligned for each frame, and for determining said time compression/expansion ratio in accordance with the change in the frame width at which the alignment of the phase and the amplitude is the best.

44. The computer program product according to claim 40, wherein said software, for transforming said audio data, includes software for shifting said start point to obtain the phase of a frequency at which information has been embedded, and for specifying the start point of a frame when said information has been embedded therein.

45. The computer program product according to claim 40, further comprising:
software for specifying, from the bit of said additional information, a synchronization signal indicating the start or the end point of repeated bits, in order to reproduce said additional information,
wherein, said specifying means includes means for specifying a sign of frames as a different frame of another sequential frames or specifying frames not including a sign of frames as delimiting frames.

46. The computer program product according to claim 40, wherein said software, for detecting said additional information, includes software for employing said delimiting bits to designate a delimiting position of bits that constitute additional information, and for reproducing said bits that constitute said additional information.

47. The computer program product according to claim 40, wherein, in order to reproduce said additional information, said software includes software for searching for delimiting bits, and for retrieving bits to which expanded bits have not been added.

48. The computer program product according to claim 40, wherein said software, for detecting said additional information, includes software for regarding, as having the same value, bits that are rendered equal by the cyclic shifting of bits, and for correlating, with additional information, bits that are not equal, so that said additional information can be retrieved without notification being given of the starting point of bits when said additional information has been embedded.

49. The computer program product according to claim 34, wherein said synchronization detection software is for transforming, into frequency components, data in one frame that has been obtained by overlapping said multiple frames, for calculating the inner product of the obtained data and a mask whose phase has been shifted, and for specifying the start point of a frame that is to be embedded by employing the phase shift at which the absolute value of said inner product is the maximum.

50. A computer program product, on a computer usable medium, for embedding additional information in audio data, said program product comprising:
(a) software for transforming said audio data into frequency components;
(b) software for determining levels of modification for each frequency component within which said additional information can be embedded based on said audio data;
(c) software for generating a mask to use for embedding said additional information wherein said mask is a pseudo-random vector that is produced by a pseudo-random number generated by a pseudo-random number generator;
(d) software for employing said embedding mask to be fit within the modification levels determined for said transformed audio data, and for adding the pattern to said transformed audio data; and
(e) software for performing inverse transformation for said modified audio data in which said additional information has been embedded to obtain audio data.

51. The computer program product according to claim 50, wherein said software for transforming said audio data constitutes software for dividing audio data to multiple frames consisting of multiple audio samples, and for transforming audio data in said frames.

52. The computer program product according to claim 51, wherein said software for analyzing frequency component distribution of said transformed audio data to determine said levels of modification for each frequency component that are aurally imperceptible to human beings.

53. The system according to claim 52, wherein said software, for embedding said additional information, is software for embedding additional information by changing frequency components within said frequency modification levels in which frequency components are changed for embedding additional information, so that in accordance with said additional information the inner products obtained by multiplying said pseudo-random vector by the frequency components of said transformed audio data in said frames have specific signs or constitute specific values.

54. The computer program product according to claim 53, wherein said software, for embedding said additional information, includes software for embedding multiple items of information by dividing frequency components into multiple sets of small frequency bands in a frame so that frequency ranges for each set of the bands are almost the same, and by using multiple orthogonal embedding masks for which all the inner products are zero.

55. The computer program product according to claim 53, wherein said software, for embedding said additional information, further includes software for embedding a synchronization signal, and wherein said software for embedding said synchronization signal includes software for changing the phases or the amplitudes of frequency components of said frames in order for said phases and said amplitudes to match each other.

56. The computer program product according to claim 53, wherein said software includes software for embedding in said frames synchronization signals having the same signs, and either embedding synchronization signals having opposite signs in delimiting frames or embedding nothing therein.

57. The system according to claim 53, wherein said software, for embedding said additional information, includes software for dividing additional information into division bit units, and for embedding a first division unit in a delimiting frame and the remaining bits in the following frames.

58. The system according to claim 53, wherein said software, for embedding said additional information, includes software for repetitively embedding additional information, and wherein said repetitive embedding means divides additional information into said division bit units, adds one or more bits to each of said division bit units to form expanded bits, and employs an exclusive-OR operation to embed delimiting bits in every other sets of expanded bits.

59. The system according to claim 53, wherein said software, for embedding said additional information, includes software for adding delimiting bits to bits of additional information, and for employing an exclusive-OR operation to embed expanded bits in every other division bits.

60. The system according to claim 53, wherein said software, for embedding said additional information, includes software for embedding bits that correspond to additional information as a cycle of bits that are rendered equal to each other by cyclic shifting.

61. The system according to claim 52, wherein said software, for embedding said additional information, is software for embedding additional information by changing, to the maximum extent possible, frequency components within said frequency modification levels in which frequency components are changed for embedding additional information, so that in accordance with said additional information the inner products produced by multiplying said pseudo-random vector and frequency components of said transformed audio data in said frames have specific signs or constitute specific values.

62. The computer program product according to claim 61, wherein said software for performing inverse transformation for said audio data transformed to frequency components is software for transforming, into multiple audio samples, frequency components including frequency components changed for embedding additional information.

63. A computer program product, on a computer usable medium, for detecting additional information that has been embedded in audio data, said program product comprising:
   (a) software for transforming said audio data into frequency components;
   (b) software for generating a detection mask, and for synchronizing said transformed audio data to detect additional information wherein said mask is a pseudo-random vector that is produced by a pseudo-random number generated by a pseudo-random number generator; and
   (c) software for employing said detection mask to synchronously detect, in said transformed audio data, bits belonging to said additional information.

* * * * *